United States Patent [19]

Wakahara

[11] Patent Number: 5,150,634
[45] Date of Patent: Sep. 29, 1992

[54] CONTROL ARRANGEMENT FOR AUTOMATIC AUTOMOTIVE TRANSMISSION

[75] Inventor: Tatsuo Wakahara, Kawasaki, Japan

[73] Assignee: Nissan Motor Co., Ltd., Yokohama, Japan

[21] Appl. No.: 792,526

[22] Filed: Nov. 18, 1991

[30] Foreign Application Priority Data

Nov. 21, 1990 [JP] Japan .................... 2-316809

[51] Int. Cl.⁵ .......................................... F16H 61/16
[52] U.S. Cl. .................... 74/866; 364/424.1
[58] Field of Search ............ 74/866; 364/424.1

[56] References Cited

U.S. PATENT DOCUMENTS 4,198,882  4/1980  Kiencke et al. ................ 74/866
5,075,858  12/1991  Marita ........................ 74/866 X
5,089,965  2/1992  Braun ....................... 364/424.1 X
5,097,725  3/1992  Sawa ....................... 364/424.1 X

FOREIGN PATENT DOCUMENTS 2-51657  2/1990  Japan .

Primary Examiner—Dirk Wright
Attorney, Agent, or Firm—Foley & Lardner

[57] ABSTRACT

When a transmission requires an upshift with the prime mover operating under minimal load, the rotational speed of the output shaft of a planetary gear set in which a one-way clutch is subject to load when torque is transmitted from the prime mover to the vehicle wheels via the transmission, is monitored and the upshift inhibited until such time as the rotational speed conditions are such as to indicate that the output shaft is rotating faster than it would be driven by the prime mover.

4 Claims, 5 Drawing Sheets

FIG. 2

| | C1 | C2 | C3 | B1 | OWC1 | B2 | C4 | B3 | OWC2 | GEAR | $a_1=0.45$ $a_2=0.45$ $a_3=0.45$ |
|---|---|---|---|---|---|---|---|---|---|---|---|
| 1ST SPEED | | | ○ | (○) | ○ | | | (○) | ○ | $\dfrac{1+a_2}{a_2} \times (1+a_3)$ | 4.67 |
| 2ND SPEED | | ○ | ○ | | | ○ | | (○) | ○ | $\dfrac{a_1+a_2}{a_2 \times (1+a_1)} \times (1+a_3)$ | 2.00 |
| 3RD SPEED | | ○ | ○ | | | | | (○) | ○ | $(1+a_3)$ | 1.45 |
| 4TH SPEED | | | ○ | | | | ○ | | | 1.00 | 1.00 |
| 5TH SPEED | | | | | | ○ | ○ | | | $\dfrac{1}{1+a_1}$ | 0.69 |
| REVERSE | ○ | | | | | | | | | $\dfrac{1}{a_1} \times (1+a_3)$ | -3.22 |

(○) USED DURING ENGINE BRAKING

CONTROL ARRANGEMENT FOR AUTOMATIC AUTOMOTIVE TRANSMISSION

BACKGROUND OF THE INVENTION

1. Field of the Invention

The present invention relates generally to automatic transmissions and more specifically to a control arrangement for a transmission which has main and auxiliary gear trains and which facilitates the reduction of shift shock.

2. Description of the Prior Art

JP-A-2-51657 discloses an automatic transmission which includes a main four speed main gear train and an auxiliary gear train which can be selective switched between high and low gears. In combination, the main and auxiliary gear trains are arranged to produce 5 forward speeds and one reverse. In order to produce the lowest gear of the main gear train, use is made of a first one-way clutch.

The auxiliary transmission includes a clutch, a brake and a second one-way clutch. When the clutch is engaged the planetary gear assumes a directly engaged condition and produces a speed change ratio of 1. When only the clutch is engaged the auxliary gear train is condition to produced direct drive while when the either of the one-way clutch or the brake is engaged a reduction gearing is established.

In the case the one-way clutch is exposed to torque which is produced from the engine it locks and transmits torque. On the other hand, in the reverse instance wherein the output shaft of the transmission is induced to rotate faster that the rotation which would be induced by the engine (e.g. the vehicle is coasting) the one-way clutch free-wheels. The brake is engaged only when engine braking is required and normally (e.g. D range conditions) the one-way clutch is used to transmit torque.

In first second and third speeds the auxiliary gear train is conditioned to produce the reduction gearing, while the actual shifting takes place in the main gear train. When the transmission is conditioned to produce third speed the main gear train produces a gear ratio of 1. Following this the auxiliary gear train is conditioned to produce direct drive (a gear ratio of 1) and establish fourth speed. Next, while the auxiliary gear train is conditioned to produce direct drive, the main gear train is shifted to produce its top speed. This results in the transmission being conditioned to produce fifth speed (overdrive).

However, with this type of transmission if the engine throttle is fully closed and the transmission undergoes in no (engine) load upshift, a large shift shock is generated.

For example, assume that the transmission is conditioned to produce second speed with the accelerator pedal depressed to a given degree, the accelerator pedal is then released to induce the engine throttle valve to fully close, and the transmission shifts up to third speed. Under these conditions the upshift takes place with the auxiliary gear train conditioned to produce the reduction gearing. However, the torque which is being produced by the engine reduces as a result of the accelerator pedal release. Before the engine output torque reaches a zero level the conditions under which the driving force is transmitted between the engine and the transmission output shaft is such that the change in torque is transmitted to the vehicle chassis and results in the generation of a large shift shock.

SUMMARY OF THE INVENTION

It is an object of the present invention to provide a control for the above type of transmission which enables the attenuation/elimination of the above described type of shift shock which tends to be encountered under no-load upshifting.

In brief, the above object is achieved by an arrangement wherein, when a transmission requires an upshift with the prime mover operating under minimal load, the rotational speed of the output shaft of a planetary gear set in which a one-way clutch is subject to load when torque is transmitted from the prime mover to the vehicle wheels via the transmission, is monitored and the upshift inhibited until such time as the rotational speed conditions are such as to indicate that the output shaft is rotating faster than it would be driven by the prime mover.

More specifically, a first aspect of the present invention comes in a transmission which has an input shaft which is operatively connected with a prime mover, and an output shaft, and which features: a first gear train capable of selectively producing a plurality of gear ratios, said first gear train being operatively connected with the transmission input shaft and having an output shaft; a second gear train which is operatively connected with the output shaft of the first gear train and which which is capable of producing a plurality of gear ratios, the second gear train being operatively connected with the transmission output shaft; a one-way clutch which is included in one of said first and second gear trains and which is subject to load when the transmission output shaft is driven to rotate by the torque applied to the transmission input shaft; load sensor means for determining the load under which the prime mover is operating; means for determining the rotational speed of the transmission input shaft; means for determining the rotational speed of the transmission output shaft; transmission control means responsive to the engine load sensor means, the transmission input shaft rotational speed sensing means and the transmission output shaft rotational speed sensing means, said transmission control means including means for determining if an upshift is required and for, in the event that the prime mover is operating under minimal load and an upshift is indicated as being necessary, inhibiting the upshift until such time as the rotational speed of the transmission output shaft exceeds the product of the input rotational speed and the gear ratio which the transmission is currently conditioned to produce.

A second aspect of the present invention comes in a method of operating a transmission which has: a first gear train capable of selectively producing a plurality of gear ratios, said first gear train being operatively connected with a transmission input shaft and having an output shaft; a second gear train which is operatively connected with the output shaft of the first gear train and which which is capable of producing a plurality of gear ratios, the second gear train being operatively connected with a transmission output shaft; and a one-way clutch which is included in one of said first and second gear trains and which is subject to load when the transmission output shaft is driven to rotate by the torque applied to the transmission input shaft; the method featuring the steps of: detecting the need for the transmission to undergo an upshift while a prime mover which is operatively connected with the transmission input shaft is operating under minimal load; monitoring the rotational speed of the output shaft of a planetary gear train is included; monitoring the a parameter which is indicative of the speed at which the output shaft should be rotated by the rotational energy being produced by the prime mover; and inhibiting the upshift until such time as the monitored rotational speed conditions are such as to indicate that the output shaft is rotating faster than it would be driven by the prime mover.

A further aspect of the present invention comes in a transmission which features: a first gear train capable of selectively producing a plurality of gear ratios, said first gear train being operatively connected with a transmission input shaft and having an output shaft; a second gear train which is operatively connected with the output shaft of the first gear train and which which is capable of producing a plurality of gear ratios, the second gear train being operatively connected with a transmission output shaft; a one-way clutch which is included in one of said first and second gear trains and which is subject to load when the transmission output shaft is driven to rotate by the torque applied to the transmission input shaft; means for detecting the need for the transmission to undergo an upshift while a prime mover which is operatively connected with the transmission input shaft, is operating under minimal load; means for monitoring the rotational speed of the output shaft of a planetary gear train is included; means for monitoring the a parameter which is indicative of the speed at which the output shaft should be rotated by the rotational energy being produced by the prime mover; and means for inhibiting the upshift until such time as the monitored rotational speed conditions are such as to indicate that the output shaft is rotating faster than it would be driven by the prime mover.

BRIEF DESCRIPTION OF THE DRAWINGS

FIG. 2 is a table showing the manner in which selective engagement of a plurality of friction elements included in the FIG. 1 transmission produces five forward speed and one reverse;

DETAILED DESCRIPTION OF THE PREFERRED EMBODIMENTS

Figure 1:
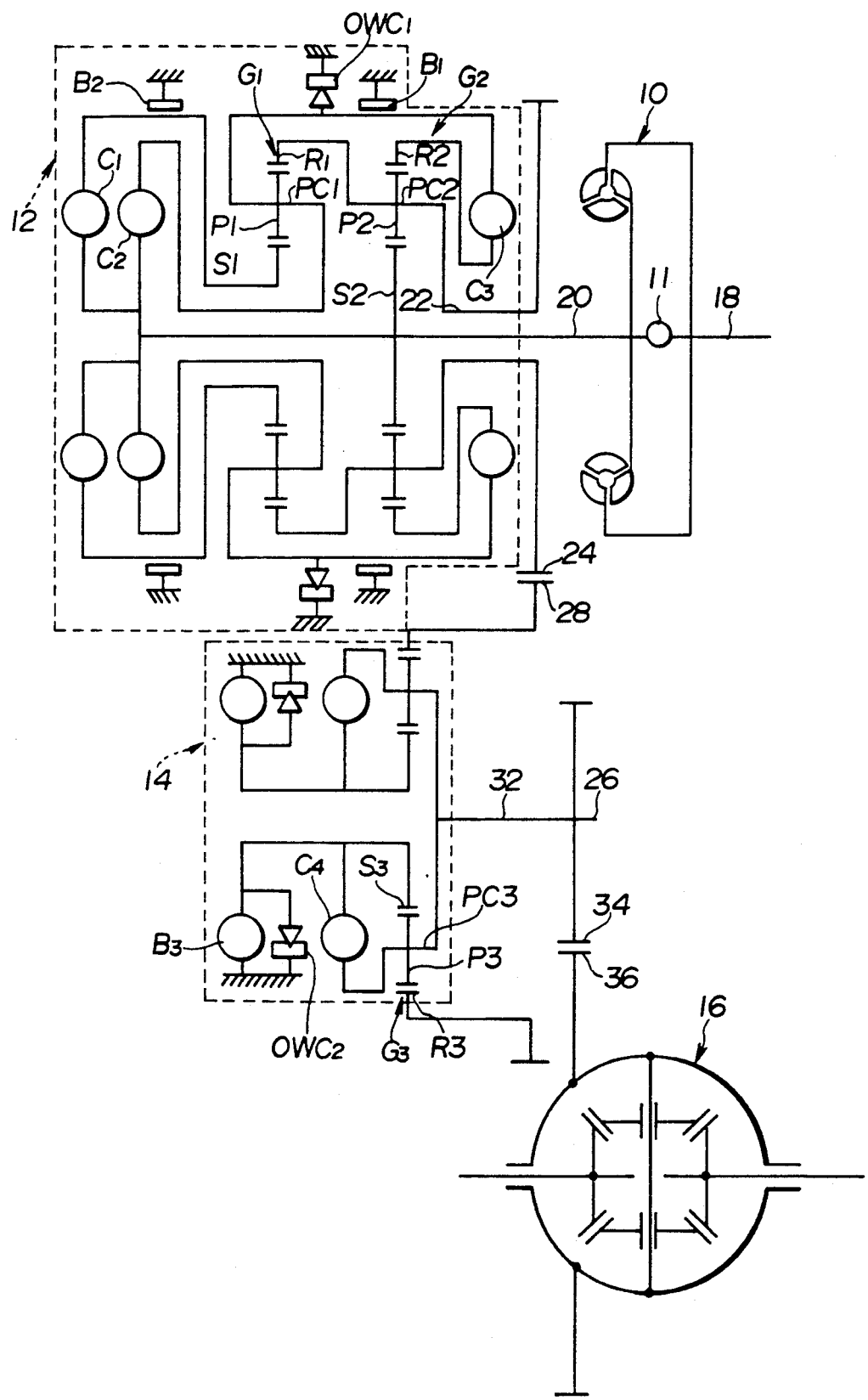
FIG. 1 is a schematic drawing showing a transmission of the nature to which the present invention is applied.

FIG. 1 schematically shows a transmission to which the present invention is applied. This transmission includes a fluid coupling device 10, a main gear train 12, an auxiliary gear train 14 and a differential unit 16. The fluid coupling comprises a torque converter which includes a lock-up clutch/device 11. A non-illustrated engine is placed in drive connection with the torque converter by way of a drive shaft 18. The rotation energy which is input to the torque converter is delivered to a shaft 20 which defines an input shaft of the main gear train. As shown, the shafts 18 and 20 are arranged to coaxial.

The main gear train comprises first and second planetary gear set G1, G2. The first gear set G1 includes a sun gear S1, an internal ring gear R1, pinon gears P1 which mesh with and operatively connect the sun and internal ring gears S1, R1, and a pinion carrier PC1. The second gear set G2 includes a sun gear S2, an internal ring gear R2, pinon gears P2 which mesh with and operatively connect the sun and internal ring gears S2, R2, and a pinion carrier PC2. The main gear train further includes first, second and third clutches C1, C2 and C3; first and second brakes B1, B2; and a one-way clutch OWC1.

As will become apparent hereinafter, by selectively engaging/disengaging the above listed five hydraulically controlled friction elements (C1,C2, C3, B1 and B2) and the one way clutch OWC1 it is possible to induce the main gear train provides an operative connection between the input shaft 20 and an output shaft 22 in a manner which enables the generation of four forward speeds (including overdrive) and one reverse.

The output shaft 24 of the main gear train is arranged parallel with the input shaft 20 and arranged to be synchronously rotatable with an output gear 24. This gear meshes with an input gear 28 of the auxiliary gear train 14. The gear ratio which is developed between the gears 24, 28 can of course be varied.

The auxiliary gear train 14 includes a third planetary gear set G3 a fourth clutch C3, a third brake B3 and a second one way clutch OWC2. The third gear set comprises a sun gear S3, an internal ring gear R3, pinon gears P3 which mesh with and operatively connect the sun and internal ring gears S3, R3, and a pinion carrier PC3. In this case the internal ring gear R3 is formed so as to be synchronously rotatable with the input gear 28 while the carrier PC3 is arranged to be synchronously rotatable with an output shaft 32 and about an axis which is coincident with an axis 26 about which a final pinion 34 is rotatable.

The fourth clutch C4 is arranged to enable a selective connection between the carrier PC3 and the internal sun gear S3. The third brake B3 is arranged is arranged to hold the sun gear S3 stationary while the second one-way clutch OWC2 is arranged in parallel with the third brake B3. The shaft 32 is arranged to be synchronously rotatable with the final pinion 34 which as shown is arranged to mesh with a final gear 36 which forms part of the differential unit 16.

The above described transmission is such as to be able to produce 5 forward speeds and one reverse. By engaging the clutches and brakes in the manner tabled in FIG. 2 it is possible to induce the five forward speeds and one reverse. At this point it should be noted that in FIG. 2 the circles denote elements which are engaged and the one-way clutches which are exposed to torque. The oe1, oe2 and oe3 values respectively denote the ratio of the number of teeth on the internal ring gears R1-R3 to the number of teeth on the sun gears S1-S3. Further, the rotational ratios which occur between shafts 32 and 20 are listed each of the five forward and one reverse speed produced by the transmission.

In connection with fourth and fifth speeds the auxiliary gear train 14 is such that the fourth clutch C4 is engaged while the third brake B3 is released. Under these conditions the auxiliary gear train is conditioned for direct drive and produces a gear ratio of 1. Viz., the rotational speed of the input gear 28 and the output shaft 32 are the same.

On the other hand, during first-third (1~3) speeds and reverse the auxiliary gear train is conditioned so that that the fourth clutch C4 is released and the third brake C3 (or alternatively, the second one-way clutch OWC2) is engaged. Under these conditions a reduction in rotational speed occurs between the input gear 28 and the output shaft 32. For example, in the case that the ratio of the teeth on the internal ring gear R3 and the sun gear S3 is 0.45 the auxiliary gear train produces a gear ratio of 1.45. This means that, as shown in FIG. 2 the gear ratio which is developed between shafts 20 and 32 becomes the gear ratio of the main gear train divided by 1.45.

Figure 3:
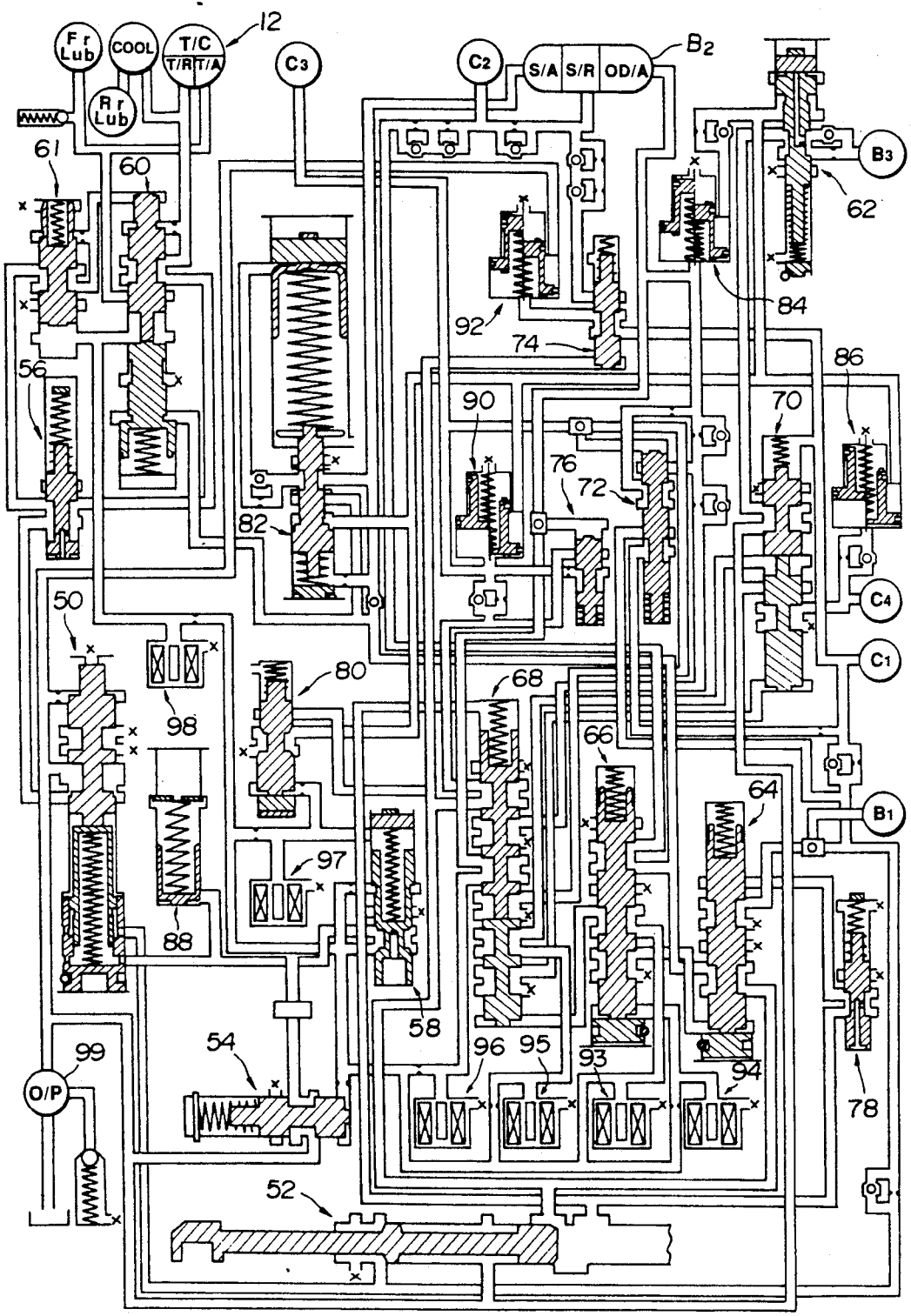
FIG. 3 shows a hydraulic control circuit which is used to control the engagement of the above mentioned plurality of friction elements.

FIG. 3 shows a hydraulic control circuit which is used to control the friction elements of the transmission. This circuit includes a pressure regulator valve 50, a manual valve 52, a pilot valve 54, a torque converter supply pressure valve 56, a pressure modifier valve 58, a lock-up control valve 60, a lock-up assist valve 61, a reduction control valve 62, a 1-2 shift valve 64, a 2-3 shift valve 66, a 3-4 shift valve 68, a 4-5 shift valve 70, and OD timing valve 72, an accumulator shift valve 74, a forward clutch timing valve 76, a first speed fixed range pressure reduction valve 78, an accumulator control valve 80, a 1-2 accumulator valve 82, an OD accumulator 84, a direct drive accumulator 86, a modifier accumulator 88, an N-D accumulator 90, a servo release accumulator 92, shift solenoids 93, 94 and 95, a timing solenoid 96, a line pressure solenoid 97 and a lock-up solenoid 98. In addition to the above the circuit further includes and/or is associated with an oil pump 99, the torque converter 12 (note that this device includes a lock-up clutch 11 having an apply chamber T/A and a release chamber T/R), the clutches C1, C2 and C3, the brakes B1, B2 and B3 (note that the brake B2 has an apply chamber S/A, a release chamber S/R and an OD apply chamber OD/A).

With this arrangement in response to vehicle speed and throttle opening degree, the clutches and brakes are appropriately supplied with hydraulic fluid.

Figure 4:
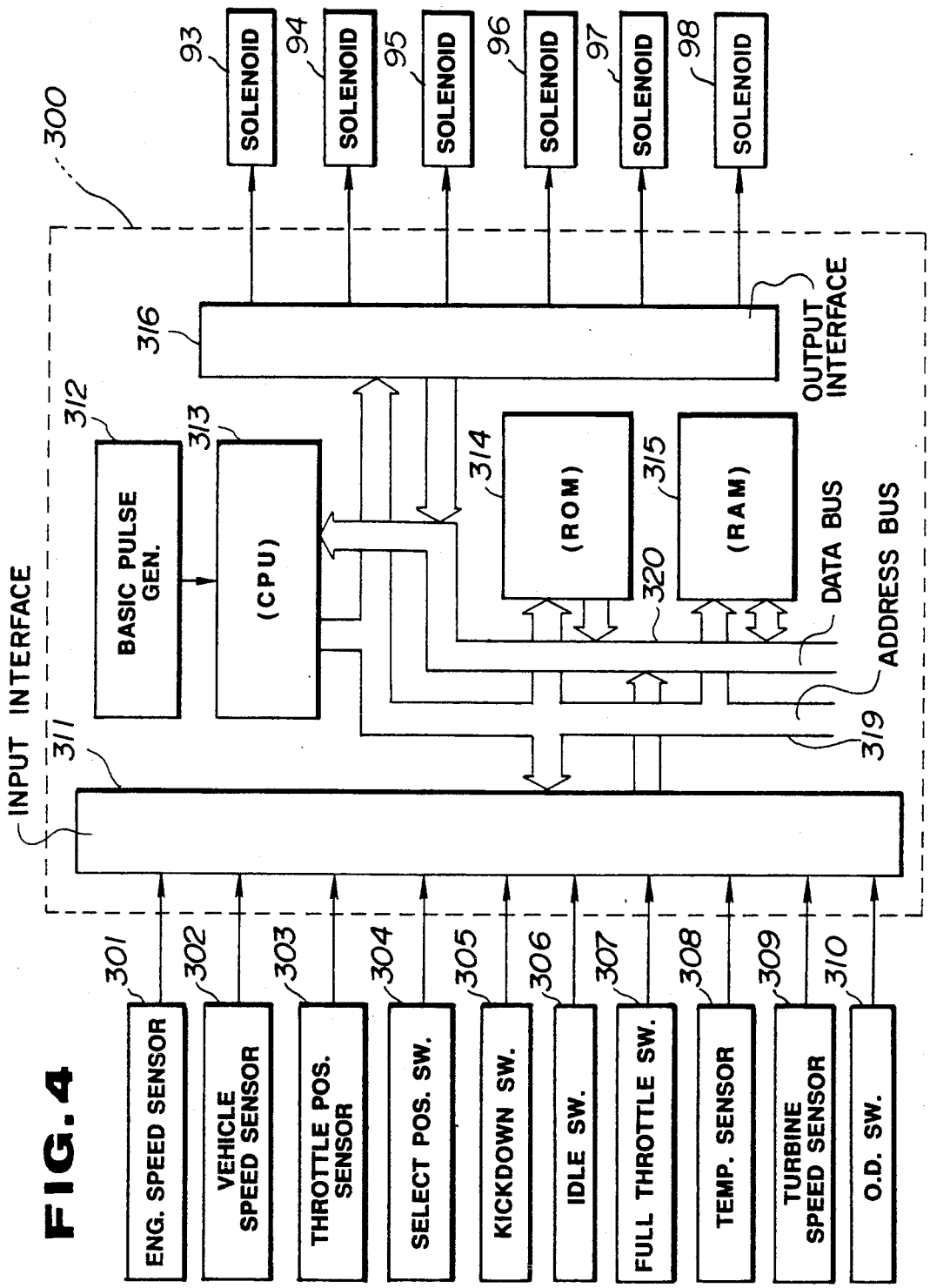
FIG. 4 is a block diagram showing a sensor/control unit configuration which is used to control a plurality of solenoids included in the circuit shown in FIG. 3.

FIG. 4 shows the manner in which the solenoids 93, 94, 95, 96, 97 and 98 are operatively connected with a control unit 300. This control unit 300 includes an input interface 311, a basic pulse generator (clock pulse generator) 312, a CPU 313, a ROM 314, a RAM 315, and an output interface 316. An address bus 319 and a data bus 320 provide an operative connection between the above listed elements. This control unit 300 is arranged to receive data input from a engine speed sensor 301, a vehicle speed sensor 302, a throttle opening degree sensor (viz., and engine load sensor) 303, a select position switch 304, a kickdown switch 305, and idle switch 306, a full throttle switch 307, a oil temperature sensor 308, a turbine rotational speed sensor 309, and an overdrive (OD) switch 310.

The ROM contains programs which are designed to read in the data supplied by the above mentioned sensors and switches, and derive various control instructions via which the control signals which are supplied to the above mentioned solenoids 93, 94, 95, 96, 97 and 98 are generated and output via the output interface 316.

Figure 5:
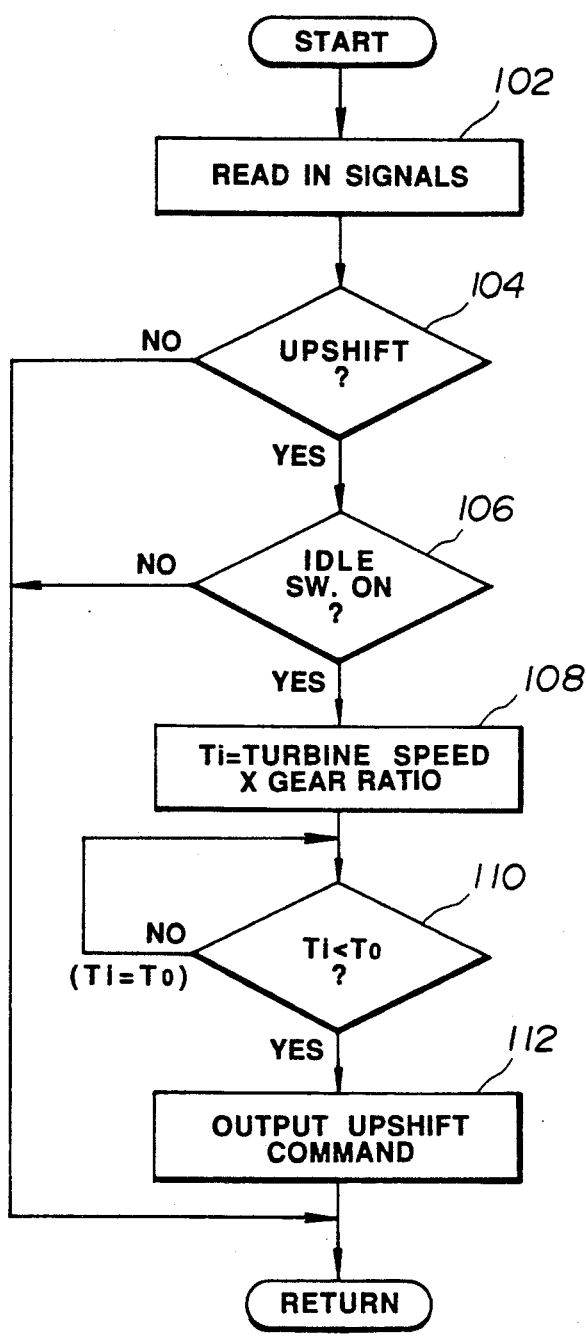
FIG. 5 is a flow chart depicting the steps executed by a control routine which characterizes the present invention.

The routine which monitors the amount of accelerator pedal depression and controls the upshifting in accordance with the present invention is shown in flow chart form in FIG. 5.

As will be appreciated the first step 102 of this routine is such as to read in a plurality signals such as the throttle opening degree, the engine rotational speed, the torque converter turbine rotational speed, the outputs of the idle and full throttle switches and the like. Following this at step 104 it is determined if conditions which demand an upshift exist or not. This decision can be made by determining the instant engine load and vehicle speed values and comparing these with a prememorized shift control schedule. In the event that the vehicle operating conditions are such as to indicate that the transmission should be induced to upshift, the routine proceeds to step 106 wherein it is determined if the idle switch is ON or not. In the event of an affirmative outcome, the routine proceeds to step 108 wherein the rotational speed value which was read in from the turbine rotational speed sensor 302 is multiplied with a value indicative of the instant gear ratio (which the transmission as a whole is currently conditioned to produce) in a manner which produces a product Ti.

In step 110 the Ti value is compared with a predetermined value To. Until Ti<To the routine is prevented from proceeding to step 112. Upon the Ti value exceeding the To value and indicating that the rotational speed of the transmission output shaft has increased to degree of running faster than it is being driven by the rotational power from the engine, the routine is permitted to enter step 112 wherein a command to generate the upshift signal indicated as being necessary in step 104 (e.g. a 2-3 upshift), is generated. This instruction is then used to determine the appropriate energization conditions for each of the solenoids 93, 94, 95, 96, 97 and 98 which are used to control the friction elements of the transmission.

In connection with the above it will be understood that the basic requirement is that the output shaft is rotating faster than it is being driven by the engine. Vis.:

$$To \times 1/\text{gear ratio} > \text{turbine speed}$$

where To is the rotational speed of the transmission output shaft However, as will be appreciated, this can be transposed to read:

$$To > \text{turbine speed} \times \text{gear ratio}$$

By denoting the left hand side as Ti (viz., Ti=turbine speed×gear ratio) it becomes apparent that when To>Ti or vice versa Ti<To, that torque is no longer being transmitted to the vehicle wheels and that a "neutral" condition has been established.

By deriving the output shaft rotational speed using the turbine rotational speed and the instant gear ratio, it is possible to detect the second one-way clutch OWC2 having changed from a load transmitting state to a freewheeling one and the transmission having assumed a quasi neutral state. Under these conditions the main gear train 12 can be conditioned to produce the next higher gear ratio while no driving torque is being transmitted between the engine and the driving wheels of the vehicle. This enables the upshift to be made with an almost negligible transfer of torque to the vehicle chassis and this virtually eliminates the shift shock problem.

In addition to the above benefit, as the upshift is permitted as soon as the one-way clutch OWC2 enters a free-wheeling state, the delay in the shift is reduce to a negligible degree.

What is claimed is:

1. In a transmission having an input shaft which is operatively connected with a prime mover, and an output shaft
   a first gear train capable of selectively producing a plurality of gear ratios, said first gear train being operatively connected with the transmission input shaft and having an output shaft;
   a second gear train which is operatively connected with the output shaft of the first gear train and which is capable of producing a plurality of gear ratios, the second gear train being operatively connected with the transmission output shaft;
   a one-way clutch which is included in one of said first and second gear trains and which is subject to load when the transmission output shaft is driven to rotate by the torque applied to the transmission input shaft;
   load sensor means for determining the load under which the prime mover is operating;
   means for determining the rotational speed of the transmission input shaft;
   means for determining the rotational speed of the transmission output shaft;
   transmission control means responsive to the engine load sensor means, the transmission input shaft rotational speed sensing means and the transmission output shaft rotational speed sensing means, said transmission control means including means for determining if an upshift is required and for, in the event that the prime mover is operating under minimal load and an upshift is indicated as being necessary, inhibiting the upshift until such time as the rotational speed of the transmission output shaft exceeds the product of the input rotational speed and the gear ratio which the transmission is currently conditioned to produce.

2. A transmission as claimed in claim 1 wherein the gear train in which the one-way clutch is included, comprises:
   a planetary gear set;
   a clutch which is arranged to selectively connect two of the elements of said planetary gear set; and
   a brake which is arranged to selective inhibit rotation of the one of the elements of said planetary gear set, said brake being arranged in parallel with the one-way clutch.

3. In a method of operating a transmission which has:
   a first gear train capable of selectively producing a plurality of gear ratios, said first gear train being operatively connected with a transmission input shaft and having an output shaft;
   a second gear train which is operatively connected with the output shaft of the first gear train and which is capable of producing a plurality of gear ratios, the second gear train being operatively connected with a transmission output shaft; and
   a one-way clutch which is included in one of said first and second gear trains and which is subject to load when the transmission output shaft is driven to rotate by the torque applied to the transmission input shaft;
   the steps comprising:
   detecting the need for the transmission to undergo an upshift while a prime mover which is operatively connected with the transmission input shaft is operating under minimal load;
   monitoring the rotational speed of the output shaft of a planetary gear train is included;
   monitoring the a parameter which is indicative of the speed at which the output shaft should be rotated by the rotational energy being produced by the prime mover; and
   inhibiting the upshift until such time as the monitored rotational speed conditions are such as to indicate that the output shaft is rotating faster than it would be driven by the prime mover.

4. A transmission comprising:
   a first gear train capable of selectively producing a plurality of gear ratios, said first gear train being operatively connected with a transmission input shaft and having an output shaft;
   a second gear train which is operatively connected with the output shaft of the first gear train and which is capable of producing a plurality of gear ratios, the second gear train being operatively connected with a transmission output shaft;
   a one-way clutch which is included in one of said first and second gear trains and which is subject to load when the transmission output shaft is driven to rotate by the torque applied to the transmission input shaft;
   means for detecting the need for the transmission to undergo an upshift while a prime mover which is operatively connected with the transmission input shaft, is operating under minimal load;
   means for monitoring the rotational speed of the output shaft of a planetary gear train is included;
   means for monitoring a parameter which is indicative of the speed at which the output shaft should be rotated by the rotational energy being produced by the prime mover; and
   means for inhibiting the upshift until such time as the monitored rotational speed conditions are such as to indicate that the output shaft is rotating faster than it would be driven by the prime mover.

* * * * *